United States Patent
Menon et al.

(10) Patent No.: US 11,678,035 B2
(45) Date of Patent: Jun. 13, 2023

(54) TRANSLUCENT IMAGING SYSTEMS AND RELATED METHODS

(71) Applicant: University of Utah Research Foundation, Salt Lake City, UT (US)

(72) Inventors: Rajesh Menon, Salt Lake City, UT (US); Ganghun Kim, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 0 days.

(21) Appl. No.: 16/753,694

(22) PCT Filed: Oct. 5, 2018

(86) PCT No.: PCT/US2018/054650
§ 371 (c)(1),
(2) Date: Apr. 3, 2020

(87) PCT Pub. No.: WO2019/071155
PCT Pub. Date: Apr. 11, 2019

(65) Prior Publication Data
US 2020/0275002 A1 Aug. 27, 2020

Related U.S. Application Data

(60) Provisional application No. 62/568,725, filed on Oct. 5, 2017.

(51) Int. Cl.
*H04N 5/225* (2006.01)

(52) U.S. Cl.
CPC ......... *H04N 5/2258* (2013.01); *H04N 5/2253* (2013.01); *H04N 5/2254* (2013.01)

(58) Field of Classification Search
CPC .. H04N 5/2258; H04N 5/2253; H04N 5/2254; H04N 5/222; G03B 19/00; G03B 15/00
See application file for complete search history.

(56) References Cited

U.S. PATENT DOCUMENTS 7,310,153 B2 12/2007 Kiesel et al.
8,760,517 B2 6/2014 Sarwar et al.
(Continued)

FOREIGN PATENT DOCUMENTS

WO WO 2007/071572 A1 6/2007
WO WO-2016154445 A1 * 9/2016 ............ G01J 3/2823

OTHER PUBLICATIONS

Ho et al.; "Sensor Geometry and Sampling Methods for Space-Variant Image Processing." Sensor Geometry and Sampling Methods for Space-Variant Image Processing; SpringerLink; Oct. 2002; vol. 5, Issue 4; pp. 369-384. Abstract Only.
(Continued)

*Primary Examiner* — Padma Haliyur
(74) *Attorney, Agent, or Firm* — Thorpe North & Western, LLP

(57) ABSTRACT

An imaging system that is translucent can be achieved by placing an image sensor (204) at one of more edges or periphery of a translucent window (202). A small fraction of light from the outside scene scatters off imperfections (218) in the translucent window (202) and reach the peripheral image sensor (204). Based on appropriate calibration of the response of point sources (206) from the outside scene, the full scene can be reconstructed computationally from the peripherally scattered light (210, 212). The technique can be extended to color, multi-spectral, light-field, 3D, and polarization selective imaging. Applications can include surveillance, imaging for autonomous agents, microscopy, etc.

28 Claims, 10 Drawing Sheets

(56) References Cited

U.S. PATENT DOCUMENTS

| | | | |
|---|---|---|---|
| 9,046,961 B2 | 6/2015 | King et al. | |
| 9,167,138 B2 | 10/2015 | Shpunt et al. | |
| 9,589,327 B2 | 3/2017 | Ivanchenko | |
| 9,605,941 B2 | 3/2017 | Ozcan et al. | |
| 9,645,008 B2 | 5/2017 | Jia et al. | |
| 9,654,675 B2 | 5/2017 | Kessler | |
| 2004/0178760 A1* | 9/2004 | Kobayashi | B60S 1/0844 318/483 |
| 2009/0181339 A1* | 7/2009 | Liang | A61B 1/24 433/29 |
| 2011/0285982 A1 | 11/2011 | Breed | |
| 2012/0249789 A1 | 10/2012 | Satoh | |
| 2013/0139950 A1* | 6/2013 | Kannaka | G01B 11/272 156/64 |
| 2015/0022643 A1 | 1/2015 | Stetson et al. | |
| 2015/0205441 A1 | 7/2015 | Bergstrom et al. | |
| 2016/0018639 A1 | 1/2016 | Spitzer et al. | |
| 2018/0052050 A1* | 2/2018 | Menon | G01J 3/36 |

OTHER PUBLICATIONS

Kim et al.; "Lensless Photography with only an image sensor." Optical Society of America; Aug. 10, 2017; vol. 56, Issue 23; pp. 1-8.

Kim et al.; "Lensless-camera based machine learning for image classification." arXiv; Sep. 3, 2017; pp. 1-2.

Kim et al.; "Computational Imaging enables a "seethrough" lensless camera." Optics Express; Sep. 3, 2018; vol. 26, No. 18; pp. 22826-22835.

Koppelhuber.; "Towards a transparent, flexible, scalable and disposable image sensor using thin-film luminescent concentrators." Optics Express; OSA; Feb. 20, 2013; vol. 21, Issue 4; 15 Pages.

Koppelhuber et al.; "A transparent thin-film sensor for multi-focal image reconstruction and depth estimation." Optics Express; OSA; 2014; vol. 22, Issue 8; pp. 8928-8942.

PCT Application No. PCT/US18/54650 Filing date Oct. 5, 2018, Rajesh Menon International Search Report dated Jan. 2, 2019; 10 Pages.

\* cited by examiner

TRANSLUCENT IMAGING SYSTEMS AND
RELATED METHODS

RELATED APPLICATION(S)

This application is a U.S. national stage under 35 U.S.C. 371 of PCT International Application No. PCT/US2018/054650, filed Oct. 5, 2018, which claims the benefit of U.S. Provisional Application No. 62/568,725 filed on Oct. 5, 2017, entitled System and Method for an Almost Transparent Imaging System, which is incorporated herein by reference.

GOVERNMENT INTEREST

This invention was made with government support under Grant No. 1533611 awarded by the National Science Foundation. The government has certain rights in the invention.

BACKGROUND

Imaging devices, such as digital cameras or color cameras, can be used to capture images. The images can be still photographs or moving images, such as videos or movies. The imaging devices can operate using light within the visible spectrum or with other portions of the electromagnetic spectrum to capture an image of a scene. Such imaging devices can use an image sensor to capture light and convert an optical image into an electronic signal that can then be stored or otherwise transmitted to construct an electronic image. Examples of image sensors can include charge-coupled devices (CCD) image sensors or complementary metal-oxide-semiconductor (CMOS) image sensors. Despite incredible advances in digital image sensors, imaging devices still rely on lenses to focus light onto the imaging sensor.

SUMMARY

An imaging system that is translucent (e.g. transparent, nearly transparent or see-through) is disclosed. This is achieved by placing an image-recording device such as an image sensor at one of more edges or periphery of a translucent layer referred to as a translucent window. The translucent window can include imperfections that are not visible to the human eye. The imperfections are unique when one translucent window is compared to another translucent window. The translucent window is exposed to light that originates from a scene. For example, the scene may contain an object such as a tree. A majority of the light may pass through the translucent window and be visible to a user. A small fraction of light from the scene can scatter off imperfections in the translucent layer and reach the image sensor which may be described as a peripheral image-recording device.

The image sensor interprets the scattered light as data related to the scene. A processor is then used to produce an image of the scene using the data from the image sensor. The processor is calibrated to identify the origin within the scene of the scattered light. The origin of the light from the scene may be referred to as a point source. The calibration processes is based on the unique properties of the imperfections in the translucent window. The techniques of the present technology can be extended to color, infrared, ultraviolet, multi-spectral, light-field, 3D, and polarization selective imaging. Applications can include surveillance, imaging for autonomous agents, microscopy, etc.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

Figure 1A:
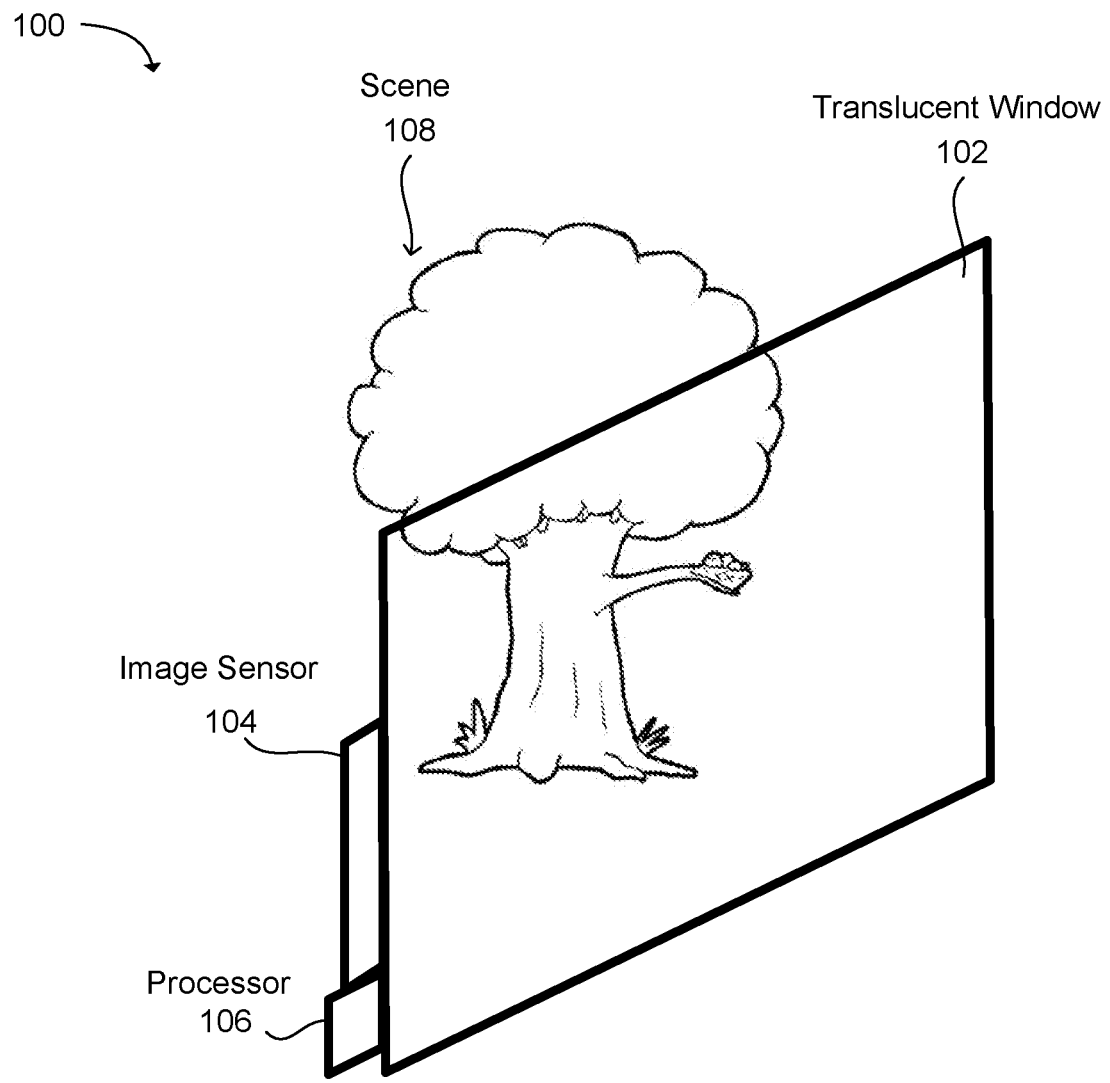
FIG. 1A is a schematic of one example imaging system in accordance with principles of the present invention.

These drawings are provided to illustrate various aspects of the invention and are not intended to be limiting of the scope in terms of dimensions, materials, configurations, arrangements or proportions unless otherwise limited by the claims.

DETAILED DESCRIPTION

While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

Definitions

In describing and claiming the present invention, the following terminology will be used.

The singular forms "a," "an," and "the" include plural referents unless the context clearly dictates otherwise. Thus, for example, reference to "a defect" includes reference to one or more of such features and reference to "subjecting" refers to one or more such steps.

As used herein, the term "about" is used to provide flexibility and imprecision associated with a given term, metric or value. The degree of flexibility for a particular variable can be readily determined by one skilled in the art. However, unless otherwise enunciated, the term "about" generally connotes flexibility of less than 2%, and most often less than 1%, and in some cases less than 0.01%.

As used herein with respect to an identified property or circumstance, "substantially" refers to a degree of deviation that is sufficiently small so as to not measurably detract from the identified property or circumstance. The exact degree of deviation allowable may in some cases depend on the specific context.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

As used herein, the term "at least one of" is intended to be synonymous with "one or more of." For example, "at least one of A, B and C" explicitly includes only A, only B, only C, and combinations of each.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of about 1 to about 4.5 should be interpreted to include not only the explicitly recited limits of 1 to about 4.5, but also to include individual numerals such as 2, 3, 4, and sub-ranges such as 1 to 3, 2 to 4, etc. The same principle applies to ranges reciting only one numerical value, such as "less than about 4.5," which should be interpreted to include all of the above-recited values and ranges. Further, such an interpretation should apply regardless of the breadth of the range or the characteristic being described.

Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given herein.

Translucent Imaging System

An imaging system can be see-through or almost see-through. An overview schematic 100 of a specific embodiment of the invention is illustrated in FIG. 1A. A translucent window 102 is facing a scene 108 to be imaged. The translucent window 102 may be composed of any suitable translucent material which allows light to pass through. Typically, the material can be nearly transparent, e.g. greater than about 75% transmittance and in some cases greater than 90% transmittance. However, translucent materials having lower transmittance can be used while still allowing the translucent window 102 to provide viewing therethrough. Furthermore, translucence can be relative to a specific spectrum of light. For example, in many cases an optical imaging system can be desirable. In such cases the translucent material can be chosen to be optically translucent over a visible spectrum (e.g. 390 to 700 nm). However, in some cases the system can be designed for imaging of infrared, ultraviolet, or other portions of the electromagnetic spectrum. These additional spectrums can be included as alternatives to optical imaging or an addition to optical imaging. Non-limiting examples of suitable translucent materials can include optical glass, silica glass, translucent and transparent plastics (acrylic, polycarbonate, polyethylene terephthalate, PET, PDMS, PMMA, polystyrene, PVA, PVC, aluminum oxide, silicon nitride, aluminum nitride, and the like. The translucent window can also include multilayers with common or different materials. Similarly, the translucent window can include optional coatings (e.g. protective coatings, hydrophobic coatings, etc).

The translucent window 102 is depicted as a flat rectangle. However, it should be appreciated that the translucent window 102 may be formed in any shape for a particular application (e.g. rectangular, square, circular, elliptical, polygonal, triangular, etc). Similarly, the translucent window can be formed as a flat planar panel, angled, or can be a curved panel (e.g. convex, concave, or multi-curvature surface). The translucent window 102 also has imperfections. These imperfections result from crystal structure lattice irregularities, impurities, and the like. Such imperfections can be smaller than about 500 μm, often smaller than 50 μm, and in some cases smaller than 1 μm. These imperfections are also randomly distributed throughout the translucent window. The imperfections are not generally visible without magnification and thus are not depicted in FIG. 1A. The imperfections may be naturally occurring in the manufacturing of the translucent window 102 or may be introduced into the translucent window 102 either intentionally or accidentally after the manufacture of the translucent window 102.

Light that originates or reflects off of the scene 108 may impinge on the translucent window 102. A majority of the light can pass through the translucent window 102 allowing the window to provide visibility for a user on an opposite side. For example, the scene 108 may include a tree and a user that is located on the other side of the translucent window 102 from the scene 108 may be able to view the scene 108 using the light that passes through the translucent window 102.

Notably, a fraction of the incoming light can impinge on the imperfections in the translucent window 102 and are thus scattered. This may be referred to as scattered light. Although specific transmittance can vary, the scattered light can generally be from 1% to 50%, and most often from 1% to 10% of incoming light depending on the particular configuration. The scattered light can travel within a plane of the translucent window toward peripheral edges of the window.

The scattered light can pass through a first surface of the translucent window 102 and then be scattered by at least one of the imperfections. Sufficient scattered light from the scene 108 may then not pass through a second surface of the translucent window 102 that is opposite of the first surface. Instead the scattered light is reflected between the first surface and second surface of the translucent window 102 until the scattered light reaches an edge of the translucent window 102. The translucent window 102 has a thickness between the first surface and the second surface and the imperfections can be located within the thickness. Thicknesses can vary widely depending on the particular design. Typically, the thickness can be equal to or greater than a minimum dimension of a corresponding image sensor so as to fully couple the image sensor to the edge.

FIG. 1A depicts an image sensor 104 coupled to an edge of the translucent window 102. The image sensor 104 can be optically associated with the edge so as to collect at least a portion of the scattered light. Suitable coupling of the sensor can include optically transparent adhesives, glue, UV-curable glue, optical glue, polyimides, airgap, etc. Roughness at this interface will enhance the coupling of light into the sensor. The surface roughness may be random or engineered to maximize this coupling.

The image sensor can be any type of image sensor designed for collecting light. For example, the image sensor 104 can be one dimensional or two dimensional and can be a charge-coupled device (CCD). The image sensor can alternatively be CMOS, quantum sensor, or the like. Similarly, multiple different types of sensors can be used on a common device (e.g. to collect multiple different image bandwidths or properties). The image sensor 104 may be coupled, attached, or otherwise adjoined to the edge of the translucent window 102 using various techniques. The scattered light (or a portion thereof) can exit the edge of the translucent window 102 associated with the image sensor 104 and then impinge upon the image sensor 104. The image sensor 104 will then generate data associated with the scattered light which can be submitted to a processor or stored in a memory for later processing.

The image sensor 104 depicts a processor 106 as being a part of the image sensor 104, although such processors can also be provided a distinct unit. The processor 106 is employed to process the data from the image sensor 104 associated with the scattered light. The processor 106 is calibrated based on the unique properties of the imperfections of the translucent window 102. Thus, each imaging system requires at least an initial calibration since each corresponding translucent window 102 has a unique pattern of imperfections. In one example, the calibration process uses a space-variant point-spread function (SV-PSF) that is measured as related to the imperfections. The processor 106 can also be used to produce an image of the scene 108 based on the data. In some cases, production of an image can include reconstruction of a viewable image. However, in other cases the production of an image can include collecting raw data so as to allow classification of the image (e.g. automated image classification). In such cases, a viewable image is not needed since software can be used to process the data and make decisions based on recognized image types. Regardless, the calibration process and the processes used to reconstruct the image are described in greater detail below. Depending on the amount of scattered light collected, configuration of the device and other variables, a resolution of the reconstructed image can vary. However, in some examples, the produced image may be considered a high resolution image. Therefore, the system of FIG. 1A can be readily used as a translucent camera system. It should be appreciated that the processor 106 may or may not be a part of the image sensor 104 and can instead be located physically remote to the image sensor 104 which transmits the data to a remote processor.

The system as depicted in FIG. 1A can use a single translucent window 102 to generate an image of the scene 108. Thus multiple widows are not relied upon to generate the image of the scene. For example, the imperfections in the single window may scatter light from multiple different wavelength which is then received by the image sensor 104. The multiple wavelengths of light also allow for a color image of the scene 108 to be produced using only the single window. Of course, multiple windows can optionally be tiled adjacent one another or stacked in series. Such additional windows can collect additional scattered light to further improve resolution in some cases. Additionally, the system as depicted in FIG. 1A can produce an image of the scene with the components described and without passing the light or the scattered light through a lens, a filter or a re-emitter.

In various embodiments, color information can be attained either by using a color image sensor or by relying on the intrinsic chromatic dispersion afforded by the light scattering process. In the latter case, multi- or even hyperspectral imaging can be performed. In that case, the SV-PSFs become wavelength dependent and a high-dimensional inverse problem can be solved to reconstruct images. In one embodiment, the SV-PSF can be dependent on the depth. If point sources are calibrated in a volume of the scene, then 3D or depth information can also be reconstructed computationally.

In one embodiment, the translucent window 102 need not be a plane as depicted. For example, the translucent window can be curved like the windshield of a car or take any arbitrary shape. For a rigid shape, the translucent window 102 can be calibrated once. With proper calibration, the device may then be used to capture any number of future images. For a flexible translucent window, the SV-PSF measurement (e.g. calibration function) will change each time the translucent window flexes to a new position. Thus, the calibration process would be performed for each new position of the translucent window. Additionally, if new imperfections are introduced to the translucent window 302, then the calibration process would be performed again to compensate for the new imperfections. Such new imperfections may occur through wear, diffusion of materials into or out of the window composition, damage, or other mechanisms.

In one embodiment, the technology can be used in a contact mode. For example, a specimen can be flowed across the surface of the translucent window 102 and images can be collected both through the translucent window 102 using both conventional imaging (e.g. a focused camera oriented on a side opposite the surface) and via the peripheral image sensor 104 using the techniques of the present technology. Such a composite imaging device can be useful for multimodal or multi-color imaging. This can be used with fluorescence, bright-field or any imaging signal.

Figure 1B:
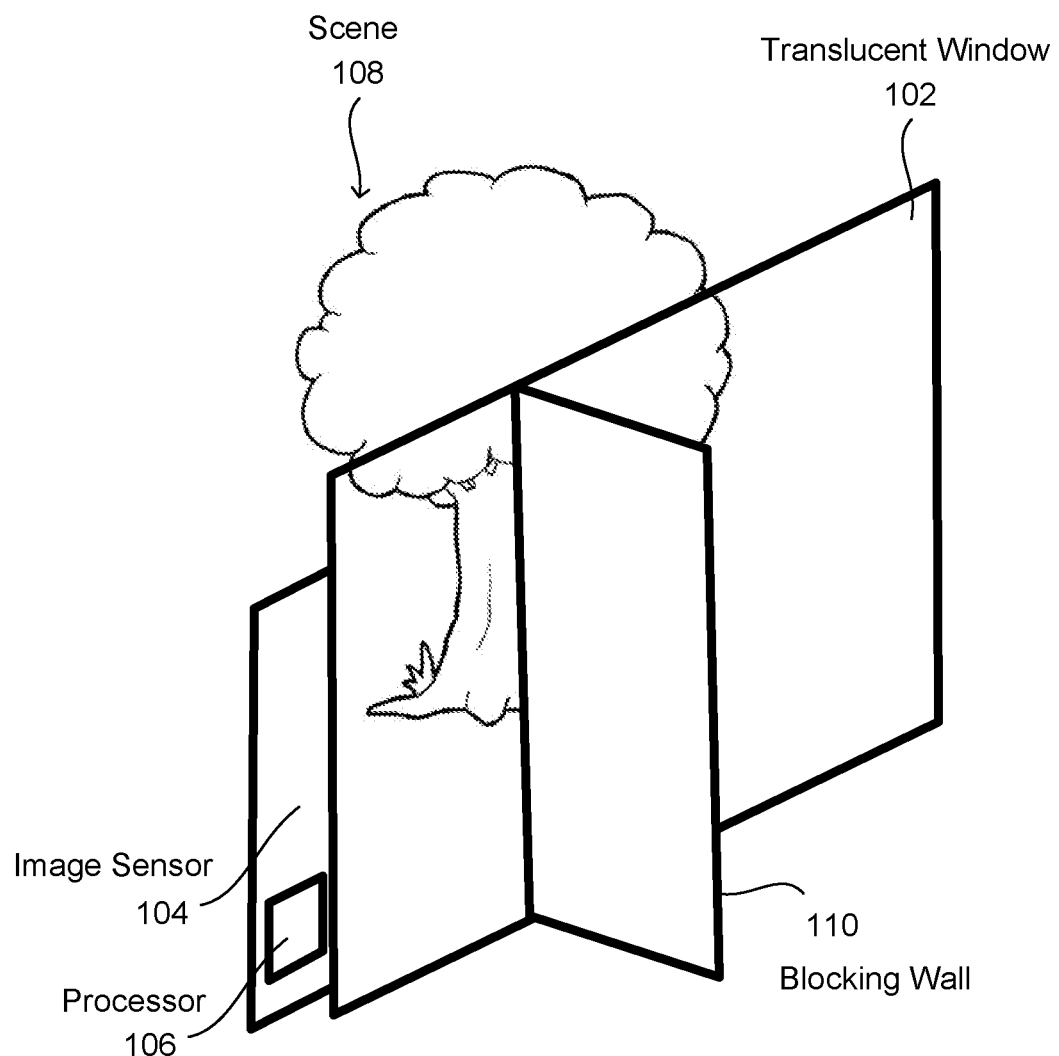
FIG. 1B is a schematic of one example imaging system with a viewing obstacle in accordance with principles of the present invention.
Figure 3:
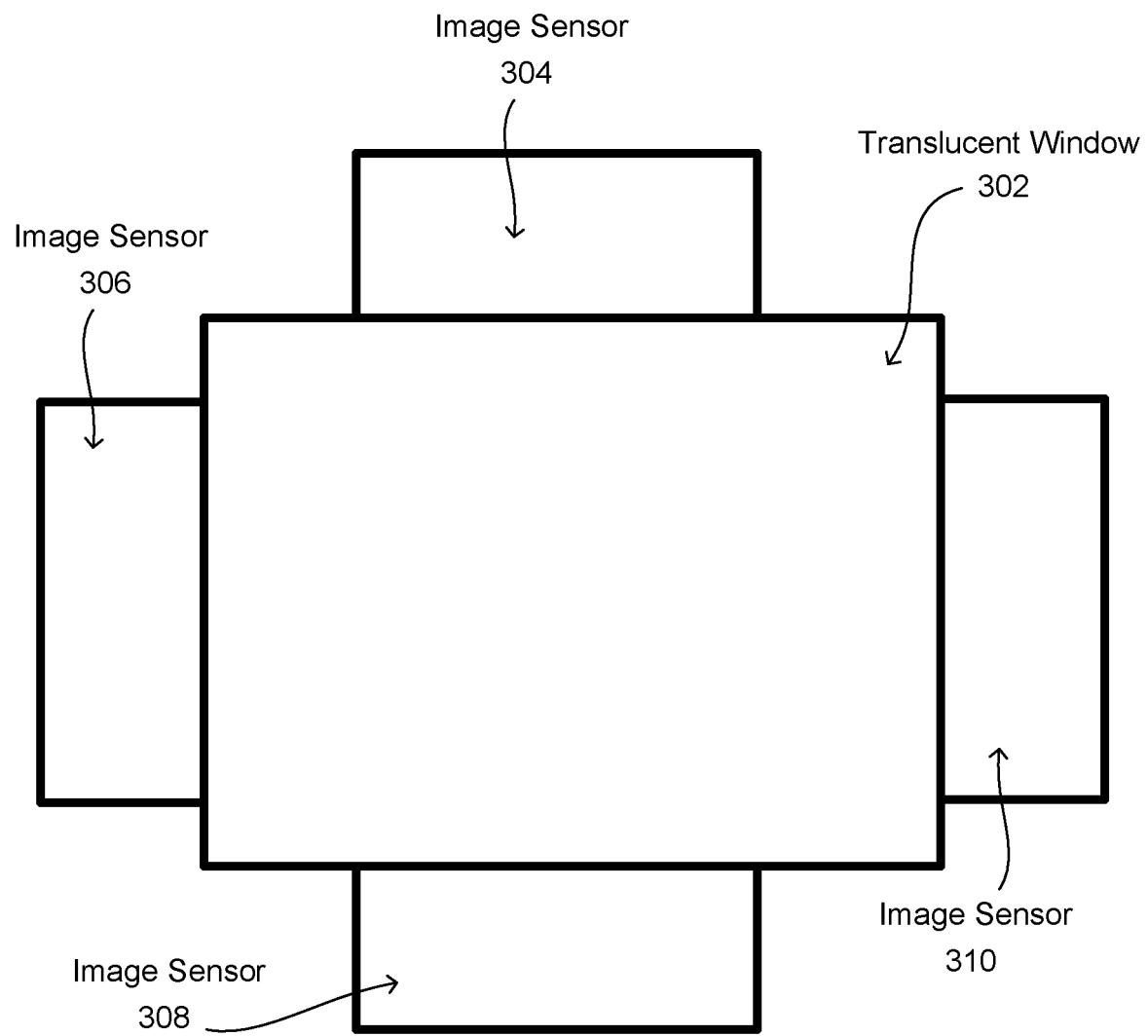
FIG. 3 is a top schematic of another example imaging system with a plurality of image sensors in accordance with principles of the present invention.

FIG. 1B depicts a specific embodiment for imaging around corners or obstacles. FIG. 1B depicts a blocking wall 110 that can be described as an actual wall such as an interior wall in a building or other structure. The blocking wall 110 can be any object that is opaque. The blocking wall 110 is depicted as be a plane that is perpendicular to the plane of the translucent window 102 and thus a viewer on one side of the blocking wall 110 (e.g. an adjacent room) may have impaired vision blocking part of the scene 102, although the angle of the blocking wall can be varied. Thus the imaging system as depicted in FIG. 3 can be applied to imaging across corners or obstacles. The portion of the translucent window 102 extending beyond the corner or blocking wall 110 can be incorporated into the wall of the building or automobile or whatever device is being used. Notably, the blocking wall 110 has no effect on the collected data of scattered light through the translucent window 102. Therefore, a full image can be reconstructed regardless of any obstructions on a side of the translucent window opposite the surface receiving incoming light. Accordingly, the system and method described here can be used for imaging where a direct line of sight is not possible. This could be useful for imaging in automobiles, drones, security cameras (where imaging around corners is needed), etc.

Figure 1C:
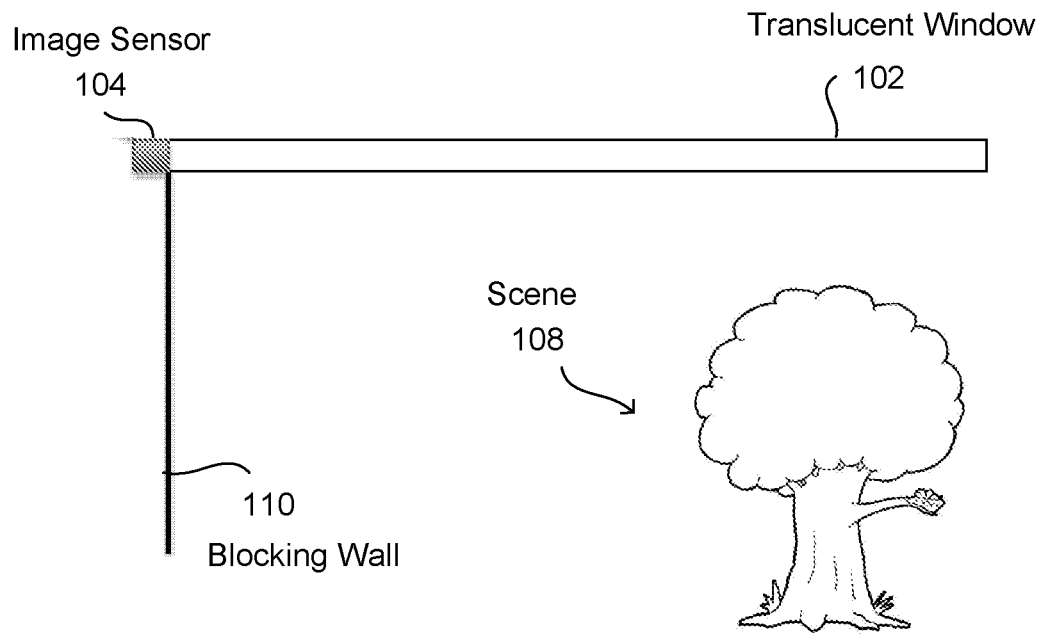
FIG. 1C is a schematic of another example imaging system with a viewing obstacle in accordance with principles of the present invention.

For example, FIG. 1C illustrates an alternative configuration similar to FIG. 1B where a translucent window 102 includes an image sensor 104 oriented at an edge. In this case, a blocking wall 110 is also oriented at the edge or periphery of the window. Incoming light from the scene 108 can traverse the translucent window 102 and a small portion of light is dispersed as discussed herein and then collected at the image sensor 104.

Figure 1D:
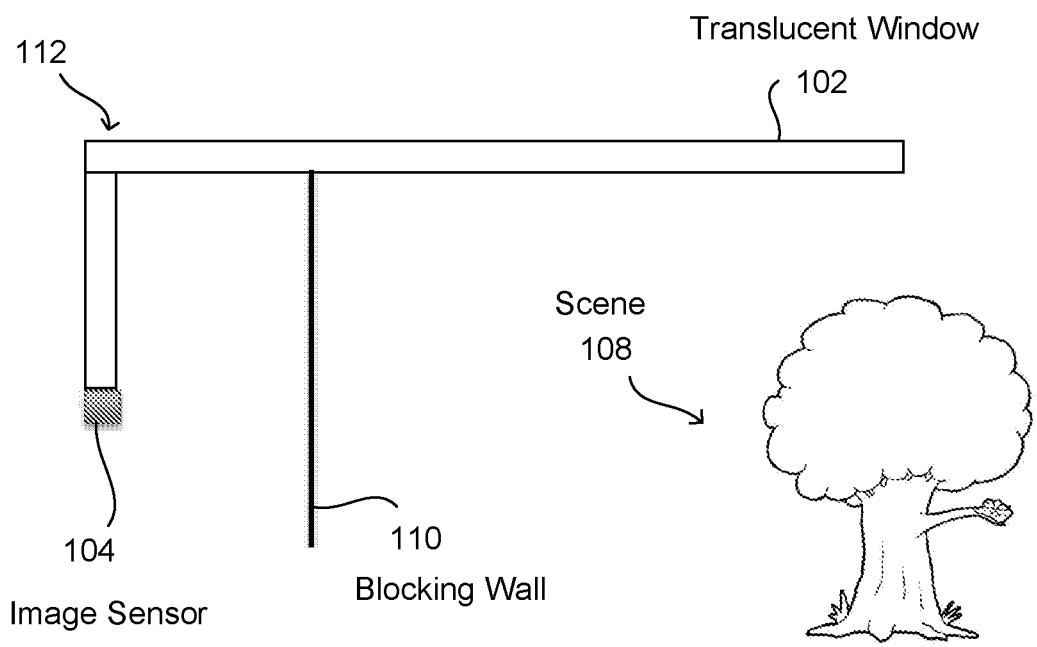
FIG. 1D is a schematic of still another example imaging system with a viewing obstacle and an angled window in accordance with principles of the present invention.

FIG. 1D illustrates yet another alternative where the translucent window 102 is angled. In this case, the image sensor 104 is oriented at an edge of the window beyond an angle 112. Dispersed light can be internally reflected within the translucent window about the angle and toward the light sensor 104. The blocking wall 110 or other similar obstruction thus does not prevent collection of image data related to the scene 108.

Figure 2:
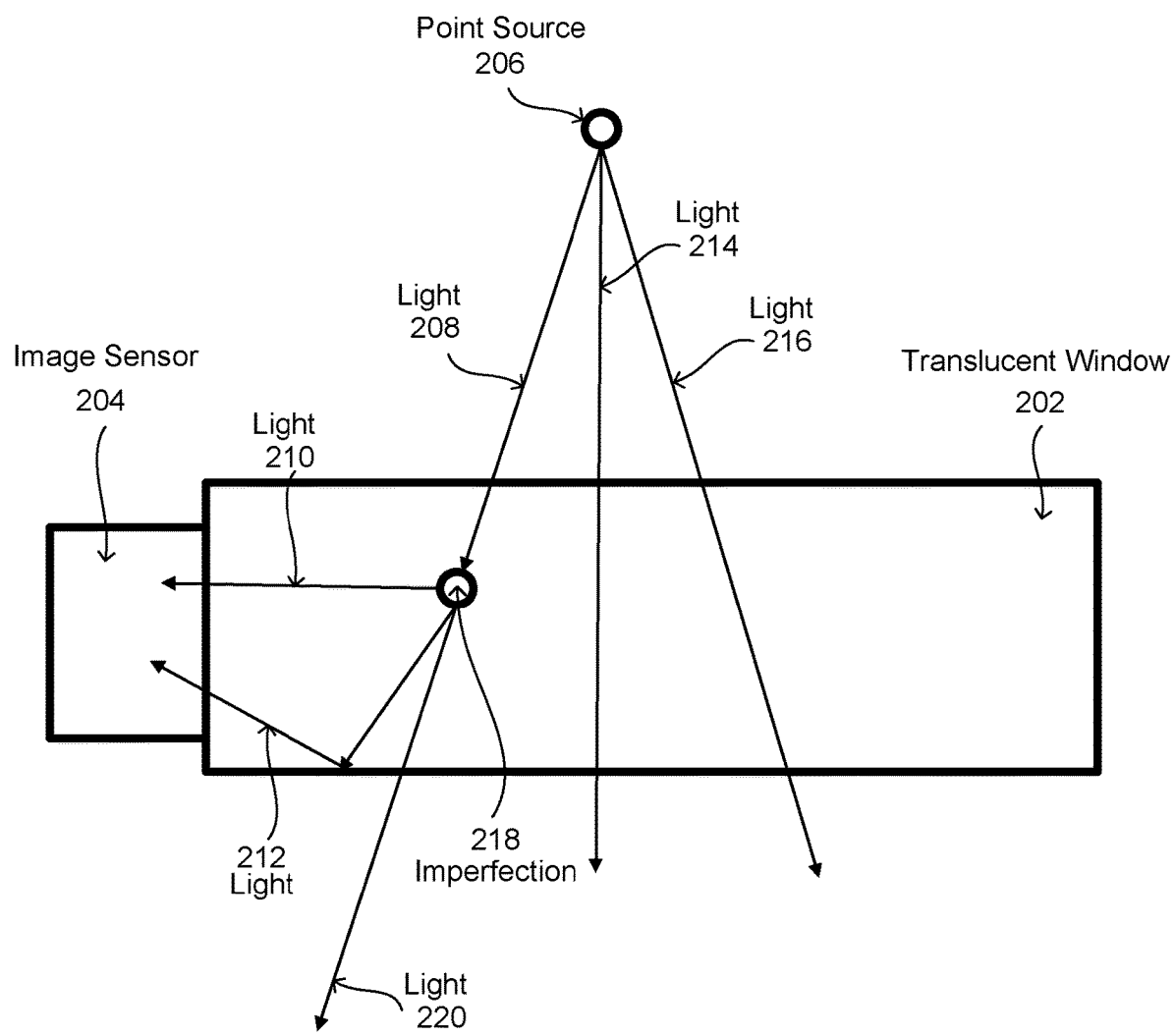
FIG. 2 is a side schematic of another example imaging system in accordance with principles of the present invention.

A side-view schematic of a specific embodiment of the invention is illustrated in FIG. 2. FIG. 2 depicts a translucent window 202 and an image sensor 204 which have all of the same features and capabilities of the translucent window 102 and the image sensor 104 of FIG. 1A with a focus on illustrating these principles from a side cross-sectional view. FIG. 2 also depicts a point source 206 which is a point source of light from a scene. A scene can comprise any number of point sources for light. For example, the point source 206 may originate or reflect light 208, 214, and 216. As depicted, light 214 and light 226 pass through the translucent window 202 and may be viewable on the other side of the translucent window 202. However, the light 208 is depicted as impinging upon an imperfection 218 of the translucent window 202. A portion of the light 208 may pass through the imperfection 218 and out the other side of the translucent window 202 as depicted by light 220. A fraction of the light 208 may be scattered by the imperfection 218. Light 210 is depicted as being scattered by the imperfection 218 and then impinging upon the image sensor 204. Light 212 is depicted as being scattered by the imperfection 218 and then reflecting off a surface of the translucent window 202 and then impinging upon the translucent window 202.

This illustration shows a single imperfection point 218 for clarity. However, it will be understood that the translucent window 202 will most often include a plurality of imperfections depending on the size, materials, and particular configuration. In some cases the translucent window can have at least 20 imperfections per cubic centimeter, in other cases more than 100 imperfections, and in some case more than one thousand imperfections per cubic centimeter which are randomly distributed throughout the translucent window. FIG. 2 depicts one imperfection, but it should be appreciated that the translucent window 202 may contain any number of imperfections forming a scattering element which essentially encodes the incoming light according to a predictable pattern once the corresponding calibration function is known. The light that is scattered by the imperfection 218 can be described as trapped within the translucent window 202. This scattered light or trapped light is relied upon to produce an image of the scene. The data generated by the image sensor 204 related to the scattered light is sensitive to the position of the original point source meaning the point source 206. In other words, each system has a unique space-variant point-spread function (SV-PSF) characteristic of that device. A first step in calibrating the system is to measure this SV-PSF.

Then, the image of a general scene and/or object can be reconstructed using linear inversion techniques, since all incoherent scenes are linear combinations of point sources, and the corresponding sensor image is the linear combination of the SVPSFs weighted by the intensity of the point sources in the scene. The calibration can be achieved by scanning a point source across the object plane, while recording the image formed on the sensor at each point location. This can be mathematically described as Equation 1:

$$O(x,y)=\Sigma_{i,j}a_{i,j}\delta(x-x_i,y-y_j) \quad \text{Equation 1}$$

where O is the object and/or scene and a$_{i,j}$ are the unknown intensities at the point sources located at $(x_i,y_j)$ making up the object.

The image formed on the image sensor 204 (here a 2D sensor is assumed, but the image sensor 204 can also be 1D) is given by Equation 2:

$$I(x',y')=\Sigma_{i,j}a_{i,j}P(x_i,y_j;x',y'). \quad \text{Equation 2}$$

where P is the SV-PSF representing the response of the system to a point source located at $(x_i,y_j)$. In matrix form, this can be written as Equation 3:

$$I=a.P \quad \text{Equation 3}$$

Finally, the unknown object can be reconstructed by inverting the SV-PSF matrix as Equation 4:

$$a=I.P^{-1} \quad \text{Equation 4}$$

This inversion can be achieved using many numerical techniques including regularization, Tikhonov regularization, iterative optimization, L2 norm minimization, etc.

In one embodiment, machine-learning techniques can be applied directly to the sensor data for image classification and related purposes. Such techniques include deep learning, convolutional neural networks, etc. One can create a database of pre-determined lensless images and then train a neural network to classify/identify such images. Then, the trained network can be used to identify the images without having to do any numerical reconstructions. In this case, an output would merely be classification of the image rather than a viewable reconstructed image. For example, classification can include recognition of an object as a person, automobile, bicycle, stop sign, stop light, pedestrian crossing, buildings, etc. Such classification can be particularly useful when the imaging system is used in a robotic system, self-driving vehicle, or the like.

An overview schematic of a specific embodiment of the invention is illustrated in FIG. 3. FIG. 3 depicts an embodiment with a plurality of image sensors each placed on an edge of a translucent window 302. Specifically, FIG. 3 depicts image sensors 304, 306, 308, and 310. The translucent window 302 and the image sensors 304, 306, 308, and 310 have the same features and capabilities of the translucent window 102 and the image sensor 104 of FIG. 1A respectively. Each of the image sensors 304, 306, 308, and 310 can collected light scattered by the imperfections in the translucent window 302. The image sensors 304, 306, 308, and 310 can each be connected to a processor to produce an image of a scene or object. The greater the number of images sensors that are employed, the greater the data will be collected and a higher resolution image of the scene will result. A translucent window with a shape different than a rectangle may be capable of employing more or less than four image sensors. Each of the image sensors 304, 306, 308, and 310 may need to be calibrated separately for the data received from the scattered light.

As an alternative to a plurality of image sensors, a reflective surface may be placed on at least a portion of edges of the translucent window 302 that does not have an image sensor. For example, if the translucent window 302 was not coupled to the image sensor 310, a reflective surface could be attached to the edge of the translucent window 302 in place of the image sensor 310. Then scattered light that impinges upon the reflective surface would be reflected to the image sensor 306 and thus the reflected scattered light will contribute to a higher resolution image of the scene. Reflective material can include, but is not limited to, metal coatings, reflective paint, and the like.

Figure 4:
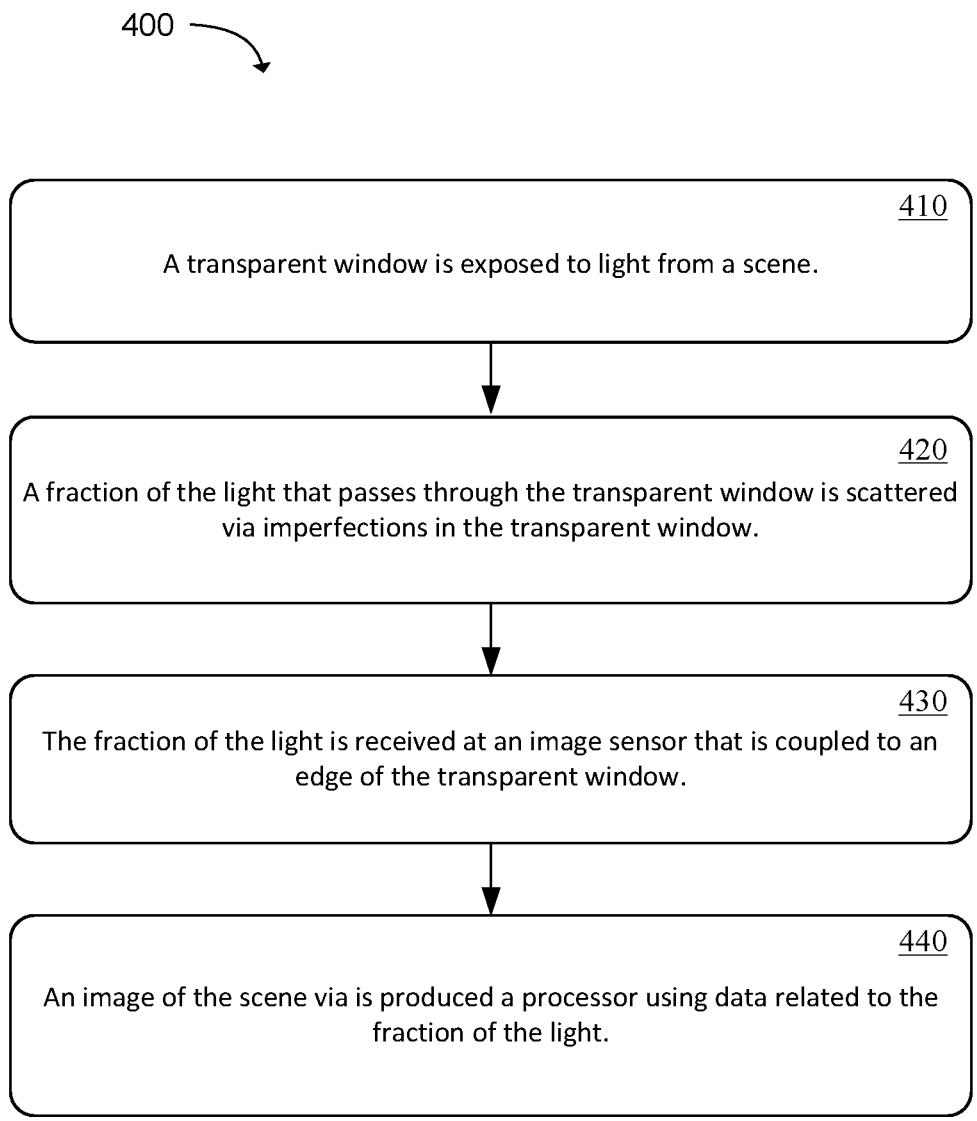
FIG. 4 is a flowchart for imaging using a translucent imaging system in accordance with principles of the present invention.

FIG. 4 depicts a flowchart of process 400 of imaging using a translucent imaging system. The process or method can be executed as instructions on a machine, where the instructions are included on at least one computer readable medium or one non-transitory machine-readable storage medium. In one embodiment, the translucent window 102, the image sensor 104, and the processor 106 of FIG. 1A or any other device or system recited herein, is configured to carry out the steps process 400. Moreover, the devices and components depicted in FIGS. 1A, 1B, 2, 3, and 5 may be employed to carry out the steps of process 400. The method can include the operation of: a translucent window is exposed to light from a scene, as in block 410. The method can include the operation of: a fraction of the light that passes through the translucent window is scattered via imperfections in the translucent window, as in block 420. The method can include the operation of: the fraction of the light is received at an image sensor that is coupled to an edge of the translucent window, as in block 430. The method can include the operation of: an image of the scene via is produced a processor using data related to the fraction of the light, as in block 440. It should be appreciated that the steps of process 400 may not include all of the steps depicted nor in the order in which they are depicted.

Figure 5:
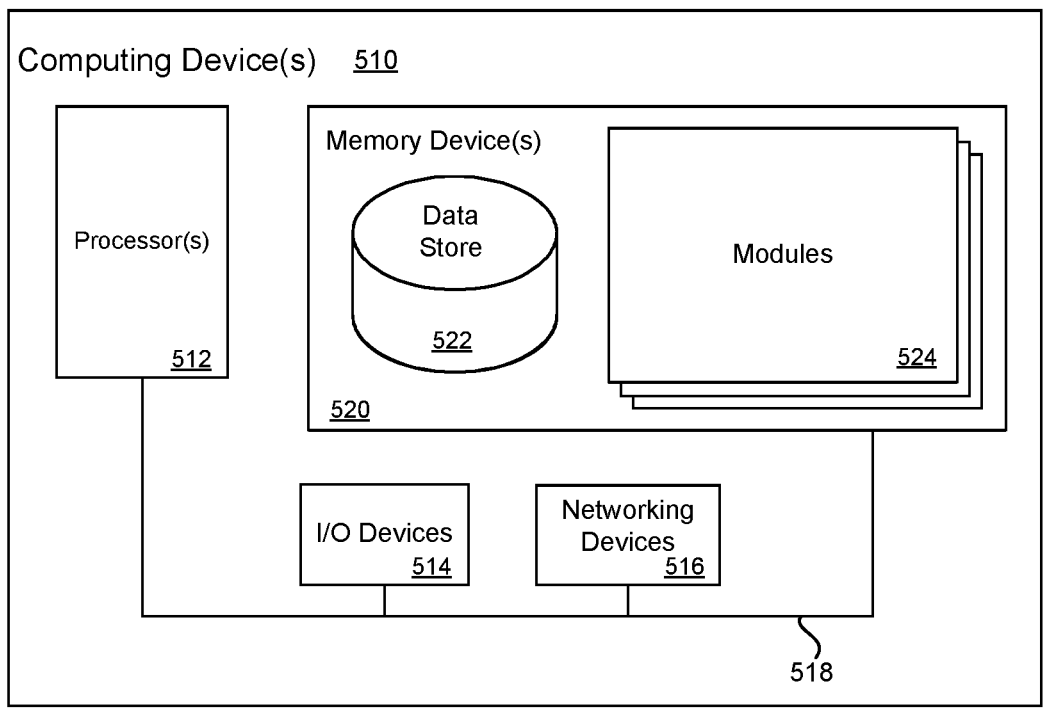
FIG. 5 is a block diagram of an example computer system in accordance with another example embodiment.

FIG. 5 illustrates a computing device 510 on which modules of this technology may execute. A computing device 510 is illustrated on which a high level example of the technology may be executed. The computing device 510 may include one or more processors 512 that are in communication with memory devices 520. The computing device may include a local communication interface 518 for the components in the computing device. For example, the local communication interface may be a local data bus and/or any related address or control busses as may be desired.

The memory device 520 may contain modules 524 that are executable by the processor(s) 512 and data for the modules 524. The modules 524 may execute the functions described earlier. A data store 522 may also be located in the memory device 520 for storing data related to the modules 524 and other applications along with an operating system that is executable by the processor(s) 512.

Other applications may also be stored in the memory device 520 and may be executable by the processor(s) 512. Components or modules discussed in this description that may be implemented in the form of software using high programming level languages that are compiled, interpreted or executed using a hybrid of the methods.

The computing device may also have access to I/O (input/output) devices 514 that are usable by the computing devices. An example of an I/O device is a display screen that is available to display output from the computing devices. Other known I/O device may be used with the computing device as desired. Networking devices 516 and similar communication devices may be included in the computing device. The networking devices 516 may be wired or wireless networking devices that connect to the Internet, a LAN, WAN, or other computing network.

The components or modules that are shown as being stored in the memory device 520 may be executed by the processor 512. The term "executable" may mean a program file that is in a form that may be executed by a processor 512. For example, a program in a higher level language may be compiled into machine code in a format that may be loaded into a random access portion of the memory device 520 and executed by the processor 512, or source code may be loaded by another executable program and interpreted to generate instructions in a random access portion of the memory to be executed by a processor. The executable program may be stored in any portion or component of the memory device 520. For example, the memory device 520 may be random access memory (RAM), read only memory (ROM), flash memory, a solid-state drive, memory card, a hard drive, optical disk, floppy disk, magnetic tape, or any other memory components.

The processor 512 may represent multiple processors and the memory 520 may represent multiple memory units that operate in parallel to the processing circuits. This may provide parallel processing channels for the processes and data in the system. The local interface 518 may be used as a network to facilitate communication between any of the multiple processors and multiple memories. The local interface 518 may use additional systems designed for coordinating communication such as load balancing, bulk data transfer, and similar systems.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. By way of example, and not limitation, communication media includes wired media such as a wired network or direct-wired connection, and wireless media such as acoustic, radio frequency, infrared, and other wireless media. The term computer readable media as used herein includes communication media.

Figure 6A:
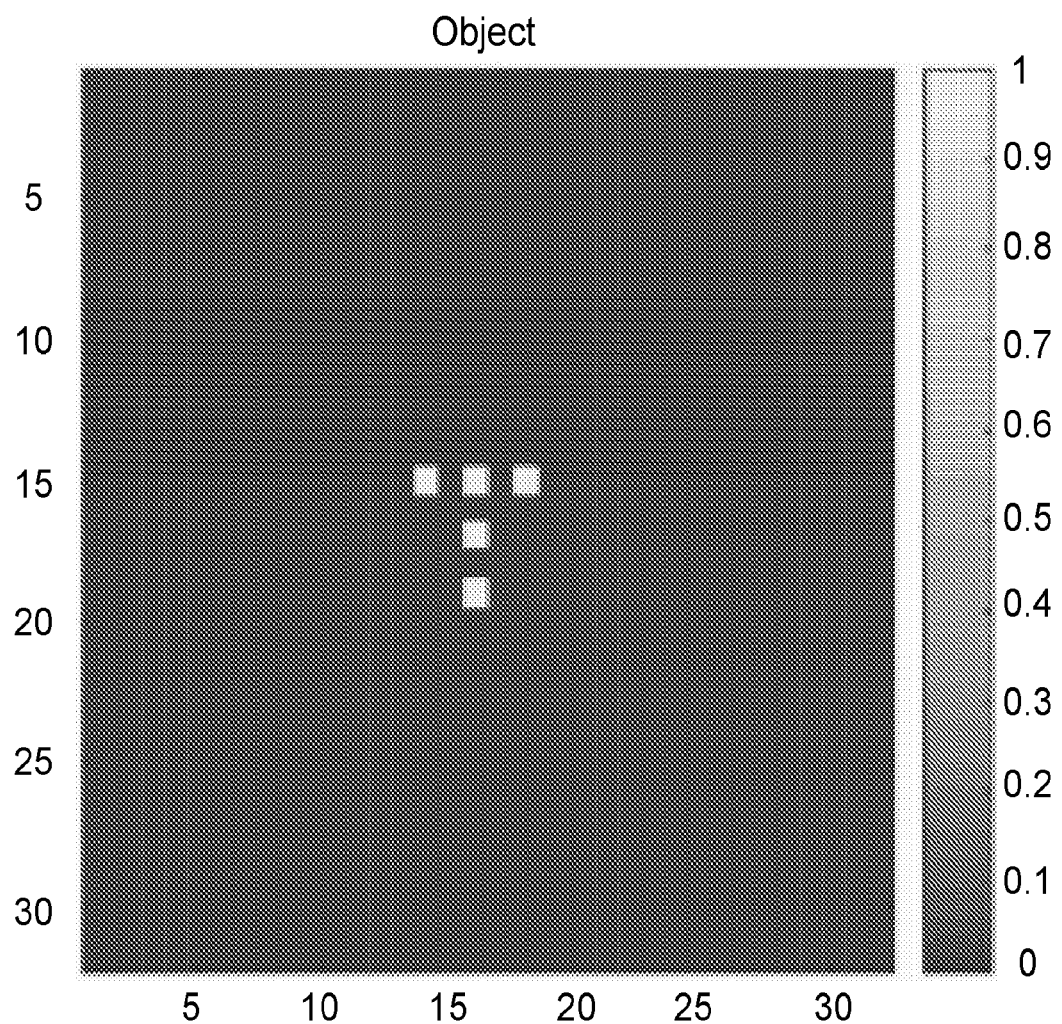
FIG. 6A is a color plot of an object.
Figure 6B:
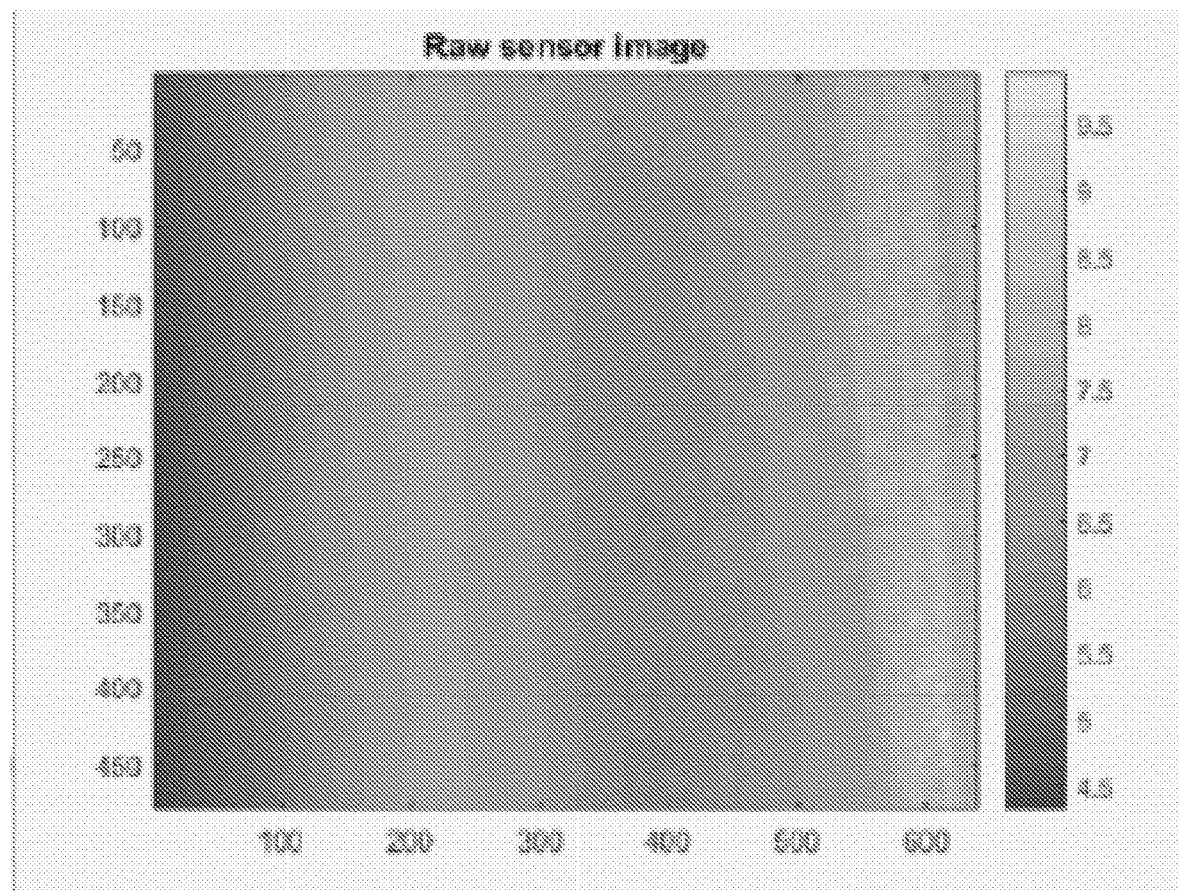
FIG. 6B is a color plot of raw image data collected from a peripheral sensor imaging the object of FIG. 6A.
Figure 6C:
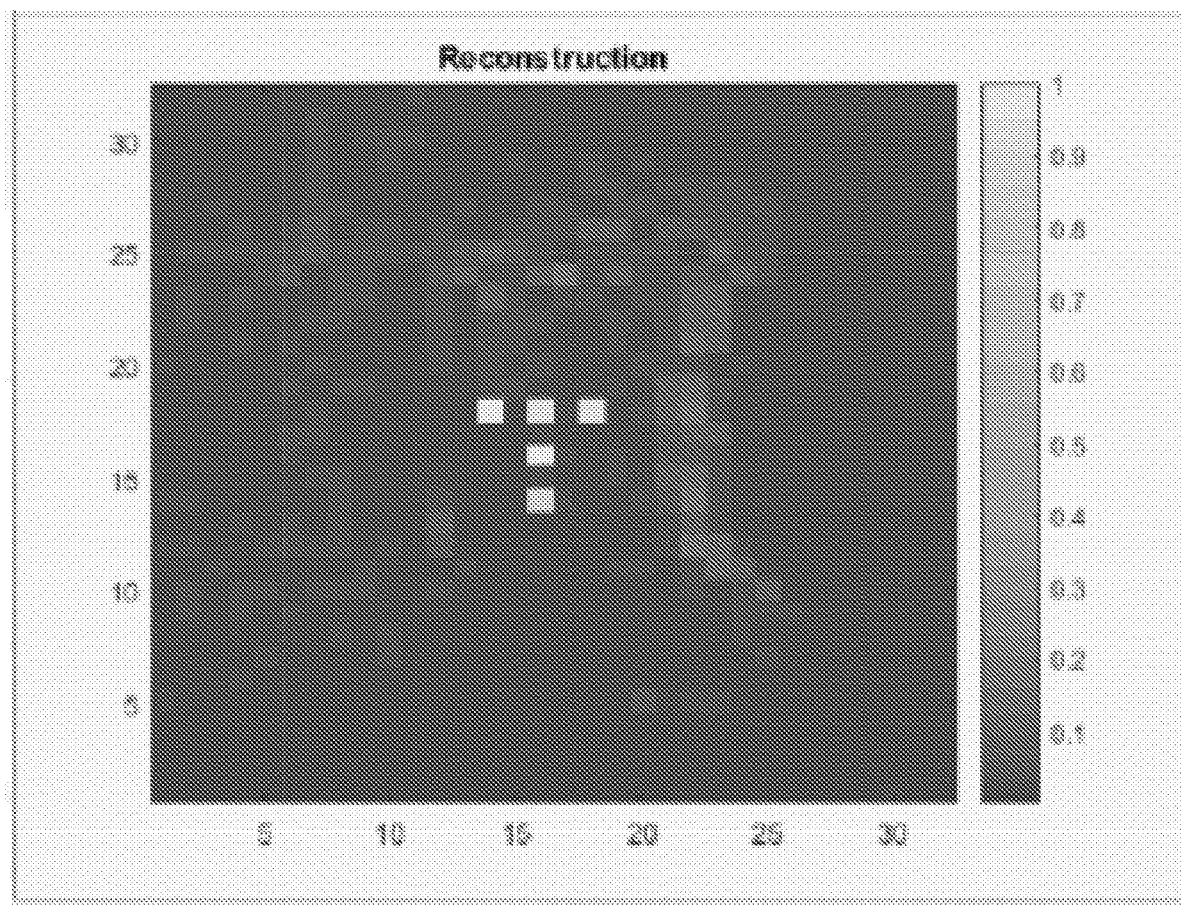
FIG. 6C is a reconstructed viewable image of the object of FIG. 6A using the raw image data of FIG. 6B.

In one example, FIG. 6A shows an object produced from an LED array to be imaged. FIG. 6B is a graphical depiction of raw sensor image data collected from a peripheral sensor using an imaging device configuration as in FIG. 1A with a fully transparent plastic sheet window and a single CMOS image sensor. FIG. 6C is a reconstructed image produced using the calibration and inversion techniques described herein. As can be seen, the reconstructed image is sufficiently clear to allow recognition of the original object. Precision of the reconstructed image can be a function of calibration quality, inversion precision, choice of materials, etc.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

What is claimed is:

1. A translucent imaging system, comprising:
   a translucent window with imperfections configured to be exposed to light from a scene, wherein the scene is oriented apart from the translucent window and is observable by an observer oriented opposite the scene across the translucent window;
   an image sensor coupled to an edge of the translucent window and configured to collect scattered light that is scattered by the imperfections in the translucent window as data, wherein the edge is along a periphery of the translucent window and the scattered light travels along a viewing plane of the translucent window toward the edge of the translucent window; and
   a processor configured to apply computations to the data collected by the image sensor to produce an image of the scene, wherein the image of the scene is produced without passing the scattered light through a lens, a filter or a re-emitter, separate from one or more translucent windows.

2. The translucent imaging system of claim 1, wherein the processor is calibrated based on the imperfections of the translucent window.

3. The translucent imaging system of claim 1, wherein the processor employs a space-variant point-spread function (SV-PSF) to identify a point source position of the scattered light in the scene.

4. The translucent imaging system of claim 1, wherein the processor is calibrated by measuring a SV-PSF as related to the imperfections.

5. The translucent imaging system of claim 1, further comprising: a plurality of image sensors wherein each of the plurality of image sensors is coupled to the translucent window at a peripheral edge of the translucent window.

6. The transparent imaging system of claim 1, wherein the transparent window has a reflective material coated on at least a portion of edges not occupied by the image sensor.

7. The translucent imaging system of claim 1, wherein the imperfections of the translucent window are randomly distributed throughout the translucent window.

8. The translucent imaging system of claim 1, wherein the translucent imaging system comprises a single translucent window, the scattered light is composed of light with multiple wavelengths, and the processor produces the image of the scene using the scattered light from the single translucent window.

9. The translucent imaging system of claim 1, wherein the processor is configured to reconstruct a viewable image of the scene.

10. The translucent imaging system of claim 1, wherein the processor is configured to classify a raw image of the scene.

11. The translucent imaging system of claim 1, wherein the translucent window forms a flat surface.

12. The translucent imaging system of claim 1, wherein the translucent window forms a curved surface.

13. A translucent imaging system, comprising:
   a translucent window with imperfections configured to be exposed to light from a scene, wherein the imperfections are not visible, wherein a fraction of the light is scattered by the imperfections within a thickness of the translucent window, and wherein a remainder of the light passes through the translucent window and is visible to a user opposite the scene across the translucent window;
   an image sensor coupled to an edge of the translucent window and configured to collect the fraction of the light that is scattered by the imperfections in the translucent window, wherein the edge is along a periphery of the translucent window and the fraction of the light that is scattered travels along a viewing plane of the translucent window toward the edge of the translucent window; and
   a processor configured to be calibrated based on unique properties of the imperfections of the translucent window and apply computations to data related to the fraction of the light that is collected by the image sensor to produce an image of the scene, wherein the image of the scene is produced without passing the fraction of light through a lens, a filter or a re-emitter, separate from one or more translucent windows.

14. The translucent imaging system of claim 13, wherein the processor employs a space-variant point-spread function (SV-PSF) to identify a point source position of the scattered light in the scene.

15. A method of imaging using a translucent imaging system, comprising:
   exposing a translucent window to light from a scene, wherein the scene is oriented apart from the translucent window and is observable by an observer oriented opposite the scene across the translucent window;
   scattering a fraction of the light that passes through the translucent window via imperfections in the translucent window;
   receiving the fraction of the light at an image sensor that is coupled to an edge of the translucent window, wherein the edge is along a periphery of the translucent window and the fraction of light that is scattered travels along a viewing plane of the translucent window toward the edge of the translucent window; and
   producing an image of the scene via a processor using data related to the fraction of the light, wherein the image of the scene is produced without passing the fraction of light through a lens, a filter or a re-emitter, separate from one or more translucent windows.

16. The method of claim 15, further comprising:
calibrating the processor based on unique properties of the imperfections of the translucent window.

17. The method of claim 15, further comprising:
identifying a point source position of where the fraction of the light originated in the scene using a space-variant point-spread function (SV-PSF).

18. The method of claim 15, wherein the processor is calibrated by measuring a SV-PSF as related to the imperfections.

19. The method of claim 15, wherein a plurality of image sensors receive the fraction of the light that has been scattered by the imperfections of the translucent window.

20. The method of claim 15, wherein the fraction of the light is reflected between two surfaces of the translucent window before impinging upon the image sensor.

21. The method of claim 15, wherein the imperfections of the translucent window are not visible.

22. The method of claim 15, wherein the fraction of the light only passes into one translucent window to produce the image of the scene.

23. The translucent imaging system of claim 1, wherein the imperfections result from crystal structure lattice irregularities.

24. The translucent imaging system of claim 1, wherein the imperfections have a size of 1 to 500 micrometers.

25. The translucent imaging system of claim 1, wherein the scattered light is from 1% to 50% of the light that impinges on the translucent window.

26. The translucent imaging system of claim 1, wherein the scattered light is from 1% to 10% of the light that impinges on the translucent window.

27. The translucent imaging system of claim 1, wherein the translucent window is formed of at least one of optical glass and silica glass.

28. The translucent imaging system of claim 1, wherein the translucent window is formed as a building window or a vehicle windshield.

* * * * *